United States Patent
Wilhelmsson et al.

(10) Patent No.: US 11,063,797 B2
(45) Date of Patent: Jul. 13, 2021

(54) TRANSMITTER, NETWORK NODE, METHOD AND COMPUTER PROGRAM

(71) Applicant: Telefonaktiebolaget LM Ericsson (publ), Stockholm (SE)

(72) Inventors: Leif Wilhelmsson, Lund (SE); Miguel Lopez, Solna (SE); Dennis Sundman, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/759,510

(22) PCT Filed: Sep. 26, 2018

(86) PCT No.: PCT/EP2018/076067
§ 371 (c)(1),
(2) Date: Apr. 27, 2020

(87) PCT Pub. No.: WO2019/086177
PCT Pub. Date: May 9, 2019

(65) Prior Publication Data
US 2020/0313941 A1    Oct. 1, 2020

Related U.S. Application Data

(60) Provisional application No. 62/581,245, filed on Nov. 3, 2017.

(51) Int. Cl.
*H04L 27/04* (2006.01)

(52) U.S. Cl.
CPC .................... *H04L 27/04* (2013.01)

(58) Field of Classification Search
CPC ......... H04L 27/02; H04L 27/04; H04L 27/12; H04B 14/004; H04B 14/02; H04B 14/023; H04B 10/541
See application file for complete search history.

(56) References Cited

U.S. PATENT DOCUMENTS 5,920,278 A    7/1999 Tyler et al.
9,787,355 B2   10/2017 Tian et al.
(Continued)

FOREIGN PATENT DOCUMENTS

EP    0977408 A2    2/2000
EP    1209841       5/2002
(Continued)

OTHER PUBLICATIONS

International Search Report and Written Opinion dated Nov. 29, 2018 for International Application No. PCT/EP2018/076087 filed on Sep. 26, 2018, consisting of 9-pages.
(Continued)

*Primary Examiner* — Siu M Lee
(74) *Attorney, Agent, or Firm* — Christopher & Weisberg, P.A.

(57) ABSTRACT

A transmitter is arranged to transmit binary information using a binary amplitude shift keying where information symbols are represented by a signal including a first power state and a second power state. A duration of a bit includes a first part where the second power state is applied irrespective of which binary value being represented, and a second part where a binary value is represented by any of the first power and a third power state or a combination pattern of the first power state and the third power state. The first power state has a higher signal power than the second power state and the third power state. The duration of the second part is equal or less the duration of the first part and the signal power of the first power state is such that the binary values are distinguishably decodable.

25 Claims, 3 Drawing Sheets

(56) References Cited

U.S. PATENT DOCUMENTS

| | | | |
|---|---|---|---|
| 2001/0017895 A1 | 8/2001 | Ohtani et al. | |
| 2008/0267324 A1 | 10/2008 | Mimura et al. | |
| 2010/0208849 A1 | 8/2010 | Grosskinsky | |
| 2012/0219092 A1* | 8/2012 | Ishihara | H04W 52/0216 375/299 |
| 2013/0343248 A1 | 12/2013 | Toner et al. | |
| 2014/0086292 A1* | 3/2014 | Akhavan | H04B 5/00 375/224 |
| 2014/0119410 A1 | 5/2014 | Tian et al. | |
| 2016/0278013 A1 | 9/2016 | Shellhammer et al. | |
| 2019/0260624 A1 | 8/2019 | Park et al. | |
| 2020/0045635 A1* | 2/2020 | Lin | H04L 27/26 |
| 2020/0127756 A1 | 4/2020 | Iwai et al. | |
| 2020/0280479 A1* | 9/2020 | Wilhelmsson | H04L 27/3809 |

FOREIGN PATENT DOCUMENTS

| | | | |
|---|---|---|---|
| EP | 1607764 A1 | 12/2005 | |
| EP | 2492841 A2 | 8/2012 | |
| EP | 2663110 A1 | 11/2013 | |
| WO | 2009044365 A2 | 4/2009 | |

OTHER PUBLICATIONS

Junghoon Suh, et. al.; "Blank GI choices under Timing Errors"; IEEE 802.11-17/1390r1; Sep. 12, 2017 consisting of 28-pages.

Eunsung Park; "Symbol Structure"; IEEE 802.11-17/1347r3; Sep. 11, 2017; consisting of 23-pages.

ETSI EN 300 328 V2.1.1; Wideband transmission systems; Data transmission equipment operating in the 2,4 GHz ISM band and using wide band modulation techniques; Harmonised Standard covering the essential requirements of article 3.2 of Directive 2014153/EU; Nov. 2016, consisting of 101-pages.

Sahin et al.; OOK Waveform Coding Scheme for Frequency Domain Multiplexing; IEEE802.11-17/1419r0; Sep. 11, 2017, consisting of 15-pages.

Park et al.; "Low-Power Wake-Up Receiver (LP-WUR) for 802.11" IEEE802.11-15/1307r1; Nov. 10, 2015, consisting of 18-pages.

Wilhelmsson et al.; "Partial OOK—Generalizing the Blank GI Idea" IEEE802.11-17/1673r1; Nov. 6, 2017, consisting of 25-pages.

Del Prete et al. Experimental Analysis of Power Optimized Waveforms for Enhancing Wake-up Radio Sensitivity; IEEE 978-1-5090-0698-4/16; 2016, consisting of 4-pages.

International Search Report and Written Opinion dated Nov. 29, 2018 for International Application No. PCT/EP2018/076104 filed on Sep. 26, 2018, consisting of 14-pages.

International Search Report and Written Opinion dated Nov. 29, 2018 for International Application No. PCT/EP2018/076067 filed on Sep. 26, 2018, consisting of 13-pages.

Non Final Office Action dated Jan. 6, 2021, issued in US. Appl. No. 16/759,592, consisting of 14 pages.

* cited by examiner

TRANSMITTER, NETWORK NODE, METHOD AND COMPUTER PROGRAM

CROSS-REFERENCE TO RELATED APPLICATIONS

This application is a Submission Under 35 U.S.C. § 371 for U.S. National Stage Patent Application of International Application No.: PCT/EP2018/076067, filed Sep. 26, 2018 entitled "TRANSMITTER, NETWORK NODE, METHOD AND COMPUTER PROGRAM FOR TRANSMITTING BINARY INFORMATION," which claims priority to U.S. Provisional Application No. 62/581,245, filed Nov. 3, 2017, entitled "METHOD AND APPARATUS FOR TRANSMITTING PARTIAL ON-OFF KEYING," the entireties of both of which are incorporated herein by reference.

TECHNICAL FIELD

The present disclosure generally relates to a transmitter, a network node, methods therefor, and computer programs for implementing the method. In particular, the disclosure relates to providing a wireless signal carrying binary information where the signal has improved properties.

BACKGROUND

The telecommunications domain has often so forth been accompanied by a significant increase of electrical energy consumption. Demands on performance, such as spectral efficiency or data rate, have been met at the expense of more energy consumption. Advances in analogue and digital electronics have enabled development of low-cost, low-energy wireless nodes. However, energy consumption remains an issue for some applications. Idle mode listening, typically used by devices related to the field commonly referred to as Internet of Things, IoT, in such networks, impacts the overall energy consumption for the devices. This is particularly noticeable when the data traffic is very sporadic.

Energy reduction may for example be performed by an approach in which it is possible to switch off a main radio frequency interface during inactive periods and to switch it on only if a communication demand occurs. For example, by using a wake-up radio, where a wake-up signal is sent by using a transmitter, received and decoded at the device, wherein the main radio is activated, significant energy consumption reduction may be achieved for many applications.

Furthermore, efforts to reduce energy consumption may be made at different levels such as the medium access control (MAC) protocol by dynamically adapting the sleep and wake times of main radio protocols. Limited complexity signals and thus limited complexity decoders for the intermittently presented control signals may improve energy efficiency.

These efforts affect the physical layer (PHY), where control mechanisms for activation or deactivation of more energy consuming operations reside, which put demands on lean control signalling.

SUMMARY

The disclosure is based on the inventors' understanding that signal-to-noise gain is achieved by keeping time where actual information is transmitted short.

According to a first aspect, there is provided a transmitter arranged to transmit binary information using a binary amplitude shift keying where information symbols are represented by a signal including a first power state and a second power state. The first power state has a higher signal power than the second power state. A duration of a bit includes a first part where the second power state is applied irrespective of which binary value being represented, and a second part where a binary value is represented by any of the first power and a third power state or a combination pattern of the first power state and the third power state. The first power state has a higher signal power than the third power state. The duration of the second part is equal or less the duration of the first part and the signal power of the first power state is such that the binary values are distinguishably decodable.

The signal power of the first power state may be selected to be a maximum power given by any of specified minimum hardware capacity of the transmitter or regulatory limitations, whichever put power boundaries.

An average power of a bit may be predefined, wherein the selection of the signal power of the first power state and the duration of the second part may be made based thereon.

The second part may comprise ½ⁿ of the duration of the bit, where n is any of 1, 2 or 3.

The duration of the second part and the signal power of the first power state may be jointly selected.

The second and third power states may have equal signal power. The second and third power states may include a zero or close to zero signal power.

The third power state may have a higher signal power than the second power state, and the second power state may include a zero or close to zero signal power.

The second power state may have a higher signal power than the third power state, and the third power state may include a zero or close to zero signal power.

The signal may be arranged to represent a first binary value of a symbol by the first power state and a second binary state of a symbol by the third power state during the second part.

The signal may be arranged such that a first binary value of a symbol is represented by the third power state during a first portion of the second part followed by the first power state during a rest of the second part, and a second binary value of a symbol is represented by the first power state during a first portion of the second part followed by the third power state during a rest of the second part.

According to a second aspect, there is provided a method performed by a transmitter to transmit binary information using a binary amplitude shift keying where information symbols are represented by a signal including a first power state and a second power state. The first power state has a higher signal power than the second power state. A duration of a bit includes a first part where the second power state is applied irrespective of which binary value being represented, and a second part where a binary value is represented by any of the first power and a third power state or a combination pattern of the first power state and the third power state. The first power state has a higher signal power than the third power state. The method comprises selecting the duration of the second part to be equal or less the duration of the first part, selecting the signal power of the first power state such that the binary values are distinguishably decodable, and transmitting the signal using the selected duration of the parts and the selected signal power of the first power state.

The selecting of the signal power of the first power state may be selected to be a maximum power given by any of specified minimum hardware capacity of the transmitter or regulatory limitations, whichever put power boundaries.

An average power of a bit may be predefined, wherein the selecting of the signal power of the first power state and the selecting of the duration of the second part may be made based thereon.

The selecting of the second part may comprise selecting ½$^n$ of the duration of the bit, where n is any of 1, 2 or 3.

The selecting of the duration of the second part and the selecting of the signal power of the first power state may be jointly performed.

The second and third power states may have equal signal power.

The second and third power states may include a zero or close to zero signal power.

The third power state may have a higher signal power than the second power state, and the second power state may include a zero or close to zero signal power.

The second power state may have a higher signal power than the third power state, and the third power state may include a zero or close to zero signal power.

The signal may be arranged to represent a first binary value of a symbol by the first power state and a second binary state of a symbol by the third power state during the second part.

The signal may be arranged such that a first binary value of a symbol is represented by the third power state during a first portion of the second part followed by the first power state during a rest of the second part, and a second binary value of a symbol is represented by the first power state during a first portion of the second part followed by the third power state during a rest of the second part.

According to a third aspect, there is provided a computer program comprising instructions which, when executed on a processor of a transmitter, causes the transmitter to perform the method according to the second aspect.

According to a fourth aspect, there is provided a communication apparatus comprising a transmitter according to the first aspect.

The communication apparatus may be a network node arranged to transmit a wake-up signal arranged to turn on a main transceiver of a remote terminal such that the network node and the remote terminal become enabled to exchange data traffic.

BRIEF DESCRIPTION OF THE DRAWINGS

The above, as well as additional objects, features and advantages of the present disclosure, will be better understood through the following illustrative and non-limiting detailed description of preferred embodiments of the present disclosure, with reference to the appended drawings.

FIG. 5 illustrates a signal with modified Manchester OOK by zero-padding a portion $T_Z$ of the signal part that traditionally would have been ON.

DETAILED DESCRIPTION

Figure 1:
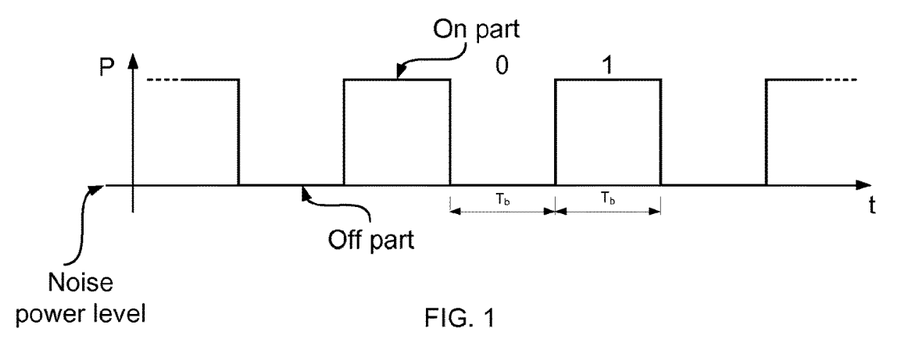
FIG. 1 schematically illustrates an on-off keying signal.

FIG. 1 schematically illustrates an On-Off Keying, OOK, signal, which is a modulation scheme where the presence of a signal represents the ON part or state and the absence of the signal represents the OFF part or state. For example, the ON and OFF parts could represent binary digits, or the transition between ON to OFF state and OFF to ON state could represent binary digits. OOK is considered the simplest form of amplitude-shift keying, ASK, that represents digital data at the presence or absence of a signal. In its simplest form, the presence of a carrier for a specific duration represents a binary one, while its absence for the same duration represents a binary zero. Some more sophisticated schemes vary these durations to convey additional information. It is analogous to a unipolar encoding line code. OOK is a suitable modulation to use whenever the power consumption of the receiver is a major concern, as the demodulation can be done non-coherently and with very relaxed requirements on gain control and resolution in the receiver.

Figure 2:
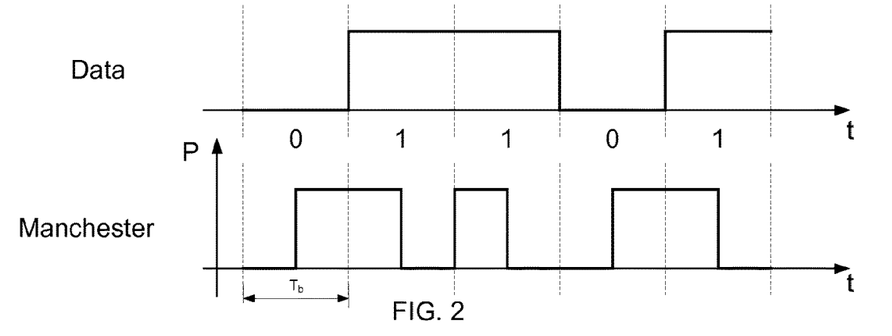
FIG. 2 illustrates a data bit with value representation.

In order to decode OOK, the receiver has to estimate which signal level corresponds to the presence of a signal and which signal level corresponds to the absence of a signal. Manchester Coding is a modulation means used to simplify clock recovery and to simplify demodulation by ensuring that the average signal level of the signal carries no information. FIG. 2 illustrates a data bit with value one is represented by, i.e. encoded to, a logical one followed by a logical zero, whereas a data bit with value zero is represented by a logical zero followed by a logical one. Alternatively, the encoding can be swapped so that a data bit with value one is represented by a logical zero followed by a logical one, etc.

Clock recovery is simplified because there will always be a transition from zero to one or vice versa in the middle of each symbol irrespectively of what the data is.

The decoding of the Manchester coded symbol is essentially done by comparing the first and the second half of the symbols and deciding in favour of a logical one if the first half of the symbol has larger power than the second half of the same symbol, or vice versa. Implementation-wise, a metric, m, is generated as $$m = r_0 - r_1,$$

where $r_0$ and $r_1$ represent the signal during the first and second half of the signalling interval, respectively, see FIG. 2. An estimate $\hat{i}$ of the $k^{th}$ information symbol, $i_k$, is then obtained by just considering the sign of the metric m, i.e., $\hat{i}=1$ if m≥0 and $\hat{i}=0$ if m<0.

Since the metric, m, is generated by subtracting the second half of the symbol from the first half, the average signal level will be removed and thus have no impact on the metric used for making the decision.

Because of the properties of the Manchester coding when it comes to being insensitive to the average signal level, it is an attractive approach when the alternative would be to estimate a decision threshold for when to decide in favour of a logical one or a logical zero.

For example, Manchester coded OOK is being standardized within the IEEE 802.11ba task group (TG). TG 802.11ba develops a standard for wake-up radios (WUR), targeting to significantly reduce the power consumption in devices based on the 802.11 standard. It is proposed to generate the wake-up signal (WUS) by using an inverse fast Fourier transform (IFFT), as this block is already available in Wi-Fi transmitters supporting e.g. 802.11a/g/n/ac. Specifically, an approach discussed for generating the OOK is to use the 13 sub-carriers in the centre, possibly excluding the DC carrier, and then populating these with some signal to represent ON and to not transmit anything at all to represent OFF.

Figure 3:
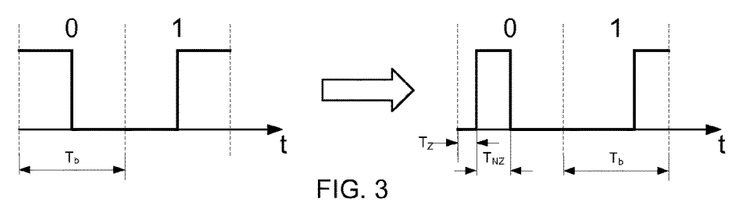
FIG. 3 schematically illustrates a modified value representation.
Figure 4:
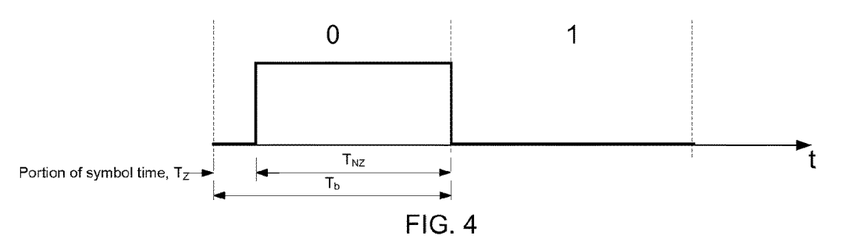
FIG. 4 illustrates a signal with modified OOK by zero-padding of a portion $T_Z$ of the symbol time $T_b$.
Figure 5:
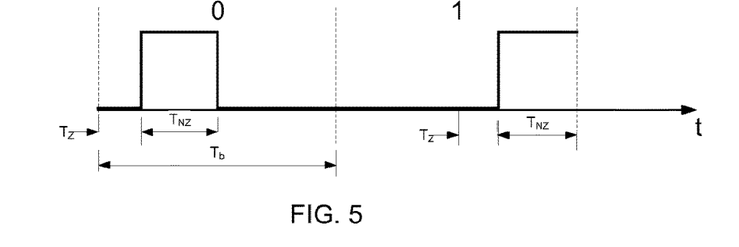

As an alternative to OOK and textbook Manchester coded OOK as shown in FIGS. 1 and 2, it is feasible to zero-pad a portion of the ON part of the signal to further improve the performance. FIGS. 3 to 5 illustrate such approaches, where $T_Z$ and $T_{NZ}$ denote the time when the ON signal, i.e. where the signal is ON in the examples given in FIGS. 1 and 2, is zero and non-zero, respectively. FIG. 3 illustrates to the left a traditional Manchester OOK and to the right an adapted keying with zero-padded parts $T_Z$. The potential improvement comes from that the same energy is received during a shorter time $T_{NZ}$. Since the noise power is proportional to that time, the signal-to-noise ratio, SNR, may be increased correspondingly upon properly arranged reception of the signal. Thus, FIG. 4 illustrates a signal with modified OOK by zero-padding of a portion $T_Z$ of the symbol time $T_b$, and FIG. 5 illustrates a signal with modified Manchester OOK by zero-padding a portion $T_Z$ of the signal part that traditionally would have been ON.

Hypothetically, the SNR can in this way be made infinite. This is impossible in practice though. There are technical and regulatory aspects that may prevent the SNR from becoming arbitrarily large.

With the above demonstrated approaches in mind, a further improvement will be presented, which is applicable to any of the approaches demonstrated with reference to FIGS. 1 to 5. Before presenting a handy solution for the further improvement, there will be a discussion on signal power of the high-power state used for the ON or $T_{NZ}$.

Figure 6:
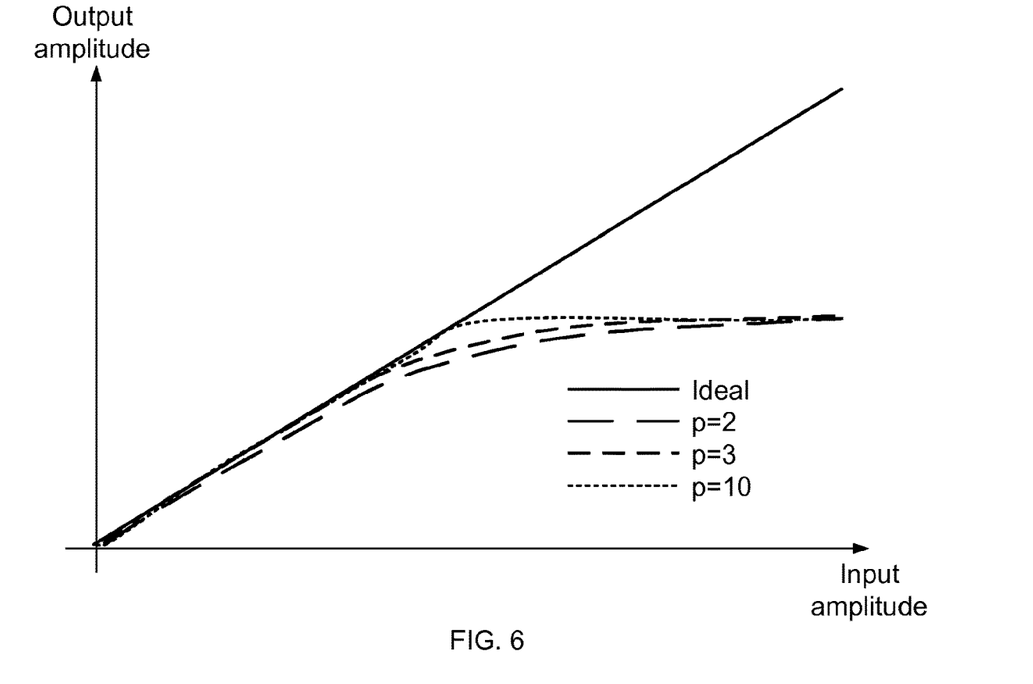
FIG. 6 illustrates an example of an input-output characteristic of a power amplifier.

In practice, there is a limit on the maximum peak power that can be used for the transmissions. One limitation may be set by a power amplifier used by the transmitter. For this limitation, it need to be considered how much power back-off is typically needed in order to ensure that the power amplifier is operating in a sufficiently linear range. FIG. 6 illustrates an example of an input-output characteristic of a power amplifier. In short, if the modulation uses a large peak-to-average ratio (PAR) a higher back-off is normally required than if a smaller peak-to-average ratio is used. Another limitation may be from radio transmission regulations or the used transmission system or radio access technology, i.e. regulatory limitations.

As an example, in IEEE 802.11, when evaluation of performance is made, it can be assumed that average transmission power is limited to 17 dBm and saturation power for the power amplifier can typically be 25 dBm. This means that the back-off is 8 dB. Here the back-off is related to the saturation power, but alternatively the back-off is related to 1 dB compression point, which is the point where the output power of the power amplifier is 1 dB less than would have been the ideal case with a linear input-output relationship.

Thus, with an aim of selecting $T_{NZ}$ as large as possible without exceeding a certain average output power or of selecting $T_{NZ}$ as small as possible keeping the average power maximized by increasing the peak power, a distinguishable decodable signal should reasonably be provided. For example, consider a bit time $T_b$ of 8 µs, average power $P_{Avg}$ of 16 dBm, peak power $P_{peak}$ of 25 dBm, $P_{OFF}$ is zero, i.e. no transmission, and probabilities of logical ones and zeroes are equal. The ratio between peak power and average power $P_{peak}/P_{Avg}$ is 8, i.e. corresponding to about 9 dB. For a modified OOK, e.g. as illustrated in FIG. 4, and with equal probability of a one and a zero being transmitted, the average power limitation of 16 dBm will be fulfilled if $T_{NZ}$ is 2 µs, i.e. ¼ of $T_b$. i.e. on average the high-power signal is transmitted 2/16 of the time (observing a one and a zero; 2 µs of high-power signal and total time of 16 µs). Signal-to-noise gain of 6 dB can thus be achieved at the receiver end. A similar effect is achieved for modified Manchester coded OOK as illustrated in FIG. 5 for any bit value probability with $T_{NZ}$ of 1 µs for respective bit value representation, i.e. on average the high-power signal is transmitted ⅛ of the time (observing any of a one and a zero; 1 µs of high-power signal and total time of 8 µs).

It has been demonstrated above how to assign the power level for the ON or high-power state together with the time for this state. Still, a practical application of this for integration with common architectures of systems where the approaches demonstrated above may be advantageous is to be presented below.

An assumption may be that the approach above may be used for lean or extremely lean transmissions, such as for wake-up signal to a wake-up radio in a receiver, where the wake-up radio has the purpose of receiving the wake-up signal and upon proper decoding thereof initiate operation of a main transceiver of the receiving entity, wherein the main transceiver commences traffic exchange with e.g. a network node. Here, the network node may be the entity comprising the transmitter discussed above. Features of receivers of such lean or extremely lean transmissions are often that they are low complexity and low power consuming. This normally leads to that they are specified for low bitrate communication. An example is that they are arranged to operate with a bitrate of ½$^n$, where n is for example 1, 2 or 3, of what is normally or in feasible operation modes used on a channel between the network node and the receiving entity, at least for the extremely lean transmissions. That is, bit time $T_b$ may be relatively long. According to a traditional approach, signal energy is distributed along the bit time $T_b$, but as demonstrated above, signal-to-noise gain can be achieved by concentrating signal energy to a part of the bit time $T_b$. One approach of doing this is to provide a signal having a first power state, a second power state, and a third power state. The first power state is the above referred high-power state, or ON-state, which then has a higher signal power than the second and third power states. The second power state is assigned to a first part of the bit time $T_b$, where the power may be zero or close to zero irrespective of which bit value is conveyed during the bit time $T_b$. During a second part of the bit time $T_b$, either the first or the third power states are applied, i.e. in case of OOK, or a pattern of the first and third power states are applied, e.g. as the above demonstrated Manchester code, for representing the respective bit values. Typically, the power levels of the second and third power states are equal, but may differ for achieving certain effects that will be demonstrated below. Here, the first and second parts may be transmitted in either order, and the first part may even be divided into two portions with one portion transmitted before the second part and the rest transmitted after the second part. The term transmitted is here used also for the first part although that part may be silent. The first part constitutes at least half of the bit time $T_b$.

The second and the third power states have signal powers that are zero or close to zero. An advantage of having for example the second power state, and also the third power state, non-zero may for example be when being applied in a radio frequency spectrum where a listen-before-talk, LBT, approach is applied. That may facilitate for other entities to spot that the channel is occupied. Another advantage may be for the receiver to distinguish the signal or roughly determine synchronisation of the signal.

The non-zero approach may enable a receiver to distinguish all parts of a signal sequence from when no signal is provided. It is reasonable to assume that a receiver is able to detect a signal at the low-power state(s) which is 30 dB below the high-power state representing the equivalence to the ON state of OOK, or higher, e.g. somewhere between 20 dB and 30 dB below the high-power state. The ratio between the high-power state and the low-power state(s) is kept high such that the states are distinguishably decodable, preferably with a ratio corresponding to at least 20 dB.

On the other hand, the zero approach has the advantage of consuming less power and generating less interference, although the difference may be small to the small power intended for the second and/or third power states of the non-zero approach, but for an average power limitation as discussed above, also the contributions by the second and third power states need to be taken into account for the non-zero approach.

Figure 7:
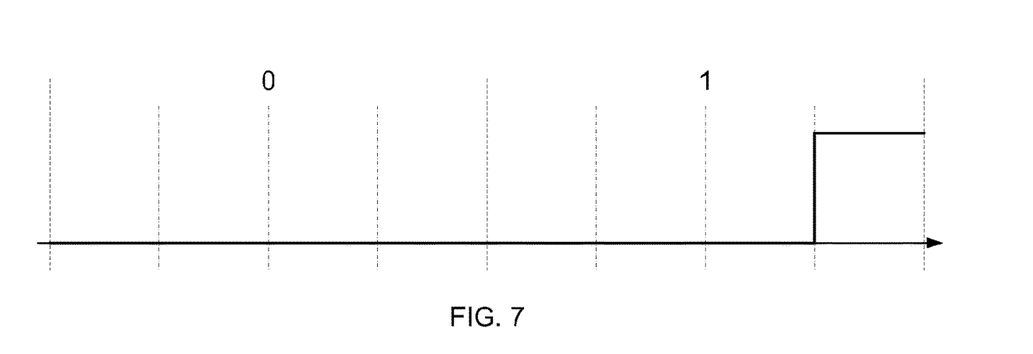
FIG. 7 illustrates a signal scheme for plain OOK according to an embodiment.
Figure 8:
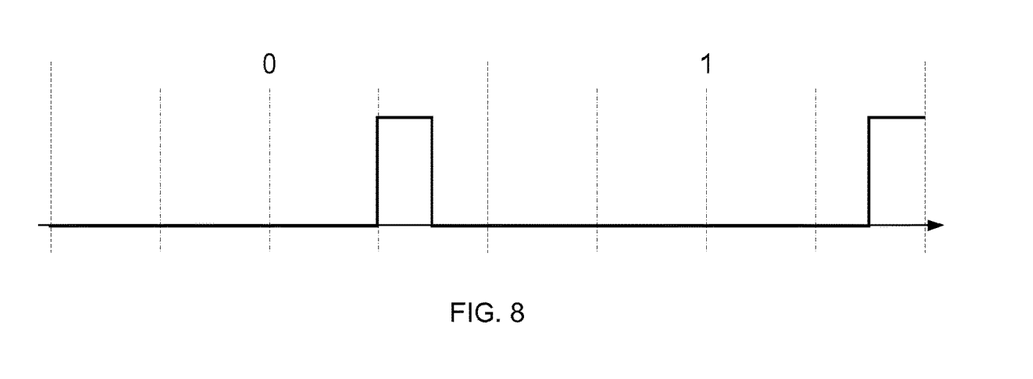
FIG. 8 illustrates a signal scheme Manchester coding according to an embodiment.

With the above demonstrated features and options, a tangible example will be demonstrated with reference to FIGS. 7 and 8, which illustrate signal schemes for plain OOK and Manchester coding, respectively, according to the suggested approaches. Consider a system operating at for example 250 kbits/s and also has a low-rate mode where it operates for example a wake-up radio on 62.5 kbits/s. The bitrate when operating on 250 kbits/s is illustrated by dot-dash lines along the time line, while the bitrate when operating on 62.5 kbits/s is illustrated by dashed lines along the time line. Consider also that the numerical example demonstrated above applies in sense of relations between average power and peak power. The reason of mentioning the faster bitrate system in this example is that the skilled reader will recognize that existing mechanisms such as timing, sampling, etc. may be reused when implementing the suggested embodiment, wherein for the selection of durations of the first and second parts, this short-cut to implementation by reusing such mechanisms may be taken into account. Thus, as indicated in the numerical example above, the OOK as illustrated in FIG. 7 is silent (or close to zero when applying the non-zero approach demonstrated above) the whole bit time when transmitting one of the binary values, e.g. "0" as illustrated in FIG. 7, and when transmitting the other of the binary values, e.g. "1" as illustrated in FIG. 7, the signal is silent (or close to zero) the first ¾ of the bit time and then the high-power state is applied for the last ¼ of the bit time. A similar approach is provided for the Manchester coding approach in FIG. 8, but where the last ¼ of the bit time is used for providing the pattern for respective binary value of the symbol. It should be noted that the last ¼ of the bit time is here used for easier understanding of a tangible example, but the part having the high-power state or the indicative pattern may of course be present anywhere during the bit pattern that is determined for the system, and thus known by both the transmitter and the receiver. However, with a handy implementation in mind for the example above, it may be chosen taking the timings of the higher bitrate system into account, and for example put the high-power state in the first ¼ of the bit time in FIG. 7 and the pattern in the first ¼ of the bit time in FIG. 8. Furthermore, if the relation between average power limitation and peak power are not sufficient to provide the signal energy within a ¼ of the bit time, the division between the always silent (or close to zero) part and the other part may be changed to ½ to ½. Similar, if the peak power is sufficient, the division may be selected to be ⅞ to ⅛. The short second part will as discussed above provide a signal-to-noise gain. Here, although the peak power is sufficient for a very short second part, the second part is reasonably not made too short since synchronisation and sampling issues at a receiver may degrade the improved performance by the herein demonstrated achievements. Considering reasonable implementations, the second part preferably should comprise $½^n$ of the duration of the bit, where n is any of 1, 2 or 3.

A further consideration is that when the above demonstrated approaches are used in a radio frequency spectrum where LBT is to be applied, the long silent (or close to zero) parts may impose problems for other entities to spot that the channel is occupied. This may be solved by for example dividing the second part into portions, e.g. two portions, which are distributed over the bit time. The time $T_{NZ}$ and thus the energy is thus distributed such that a remote entity is more likely to spot that the channel is occupied.

Thus, as discussed for the practical allocation of the second part, which may be static or dynamic following certain rules set up for the system such that the transmitter and receiver agrees, there may be a mapping of the second part, and thus indirectly the first part, to the bit time.

Figure 9:
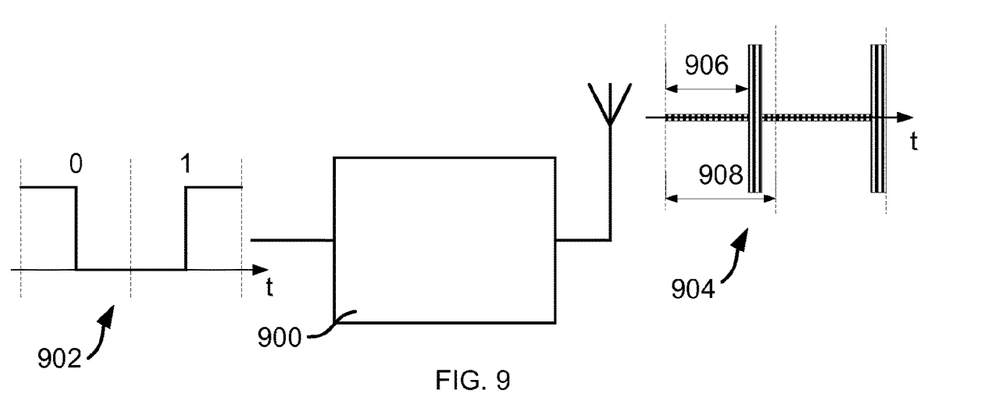
FIG. 9 schematically illustrates a transmitter according to an embodiment.

FIG. 9 schematically illustrates a transmitter 900 which is arranged to transmit binary information using the binary amplitude shift keying demonstrated above with reference to the different embodiments. Information symbols 902 are represented by a transmitted signal 904 including the power states demonstrated above. The transmitter 900 is thus arranged to provide the signal where the first power state has a higher signal power than the second power state, and the second power state is used during all of a first part 906 of a bit time 908, where the first part 906 is at least half the bit time 908.

Figure 10:
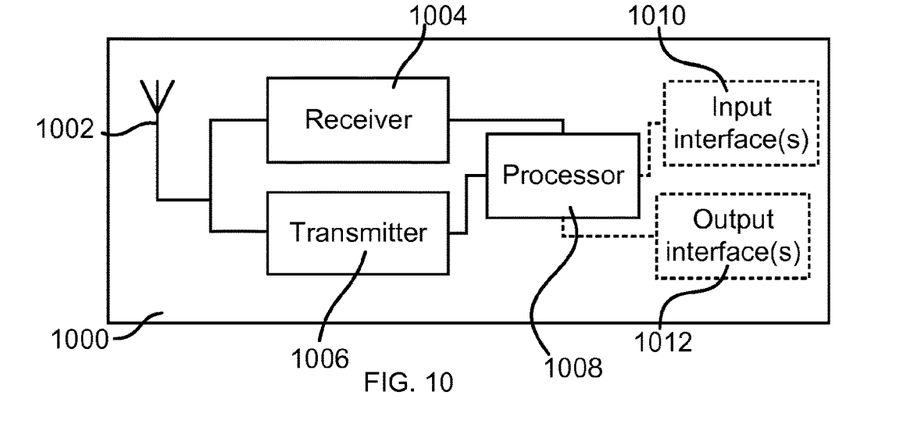
FIG. 10 is a block diagram schematically illustrating a network node according to an embodiment.

FIG. 10 is a block diagram schematically illustrating a network node 1000 according to an embodiment. The network node 1000 comprises an antenna arrangement 1002, a receiver 1004 connected to the antenna arrangement 1002, a transmitter 1006 connected to the antenna arrangement 1002, a processing element 1008 which may comprise one or more circuits, one or more input interfaces 1010 and one or more output interfaces 1012. The interfaces 1010, 1012 can be operator interfaces and/or signal interfaces, e.g. electrical or optical. The network node 1000 may be arranged to operate in a cellular communication network. In particular, by the processing element 1008 being arranged to perform the embodiments demonstrated with reference to FIGS. 1 to 9, the network node 1000 is capable of transmitting a signal as demonstrated above. The transmitter 1006 is here to be regarded as either a single transmitter used for both the signal demonstrated above, e.g. wake-up signal, paging signal, control signal, etc., and for other traffic, e.g. associated with a cellular or wireless local area network, or as a transmitter arrangement comprising one transmitter arranged for traffic associated with e.g. a cellular or wireless local area network, and another transmitter arranged and dedicated to provide the signal demonstrated above. The processing element 1008 can also fulfil a multitude of tasks, ranging from signal processing to enable reception and transmission since it is connected to the receiver 1004 and transmitter 1006, executing applications, controlling the interfaces 1010, 1012, etc.

Figure 11:
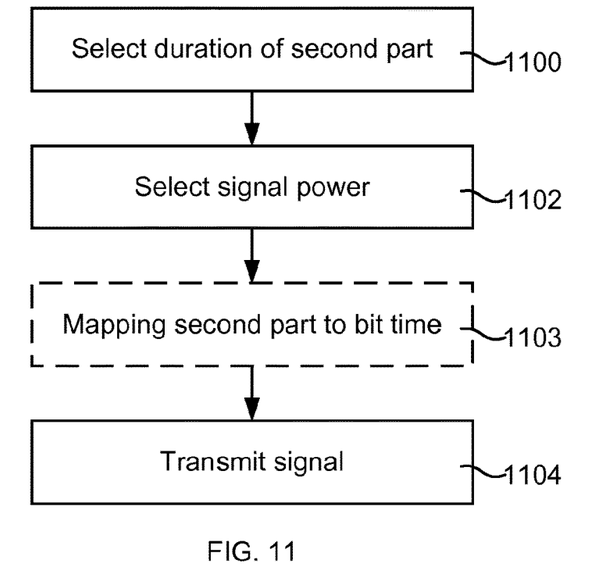
FIG. 11 is a flow chart schematically illustrating methods according to embodiments.

FIG. 11 is a flow chart schematically illustrating methods according to embodiments. The method is performed by a transmitter, e.g. any of the transmitters 900, 1006 demonstrated with reference to FIGS. 9 and 10, respectively, to transmit binary information using a binary amplitude shift keying where information symbols are represented by a signal including a first power state and a second power state. The first power state has a higher signal power than the second power state. A duration of a bit includes a first part where the second power state is applied irrespective of which binary value being represented, and a second part where a binary value is represented by any of the first power and a third power state or a combination pattern of the first power state and the third power state. The first power state has a higher signal power than the third power state. Furthermore, the signal may apply any of the options demonstrated above. The method comprises selecting 1100 the duration of the second part to be equal or less the duration of the first part, and selecting 1102 the signal power of the first power state such that the binary values are distinguishably decodable. As demonstrated above, the selections 1100, 1102 may be provided jointly, and different rules and limitations may be applied. Optionally, the second part is mapped to the bit time according to certain rules, where these rules are to ascertain that the transmitter and a receiver of the signal are in agreement. The signal is thus formed as demonstrated above, and is transmitted 1104 using the selected duration of the parts and the selected signal power of the first power state, and where applicable with the selected mapping.

Figure 12:
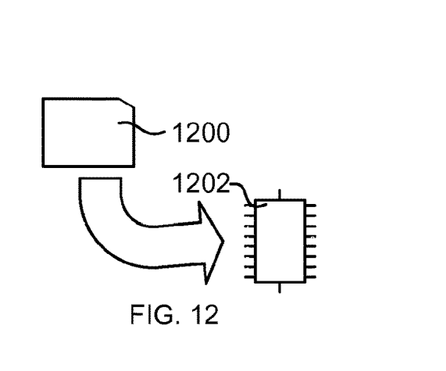
FIG. 12 schematically illustrates a computer-readable medium and a processing device.

The methods according to the present disclosure are suitable for implementation with aid of processing means, such as computers and/or processors, especially for the case where the processing element 1008 demonstrated above comprises a processor handling the selection of duration of the second part and the selection of signal power for the first power state, and possibly for the mapping of the second part. Therefore, there is provided computer programs, comprising instructions arranged to cause the processing means, processor, or computer to perform the steps of any of the methods according to any of the embodiments described with reference to FIGS. 1 to 9. The computer programs preferably comprise program code which is stored on a computer readable medium 1200, as illustrated in FIG. 12, which can be loaded and executed by a processing means, processor, or computer 1202 to cause it to perform the methods, respectively, according to embodiments of the present disclosure, preferably as any of the embodiments described with reference to FIGS. 1 to 9. The computer 1202 and computer program product 1200 can be arranged to execute the program code sequentially where actions of the any of the methods are performed stepwise, or be made to perform the actions on a real-time basis. The processing means, processor, or computer 1202 is preferably what normally is referred to as an embedded system. Thus, the depicted computer readable medium 1200 and computer 1202 in FIG. 12 should be construed to be for illustrative purposes only to provide understanding of the principle, and not to be construed as any direct illustration of the elements.

The invention claimed is:

1. A transmitter configured to:

transmit binary information using a binary amplitude shift keying, information symbols being represented by a signal including a first power state and a second power state, the first power state having a higher signal power than the second power state, a duration of a bit including a first part where the second power state is applied irrespective of which binary value is represented and a second part where a binary value is represented by one of the first power state, a third power state and a combination pattern of the first power state and the third power state, the first power state having a higher signal power than the third power state;

select the duration of the second part to be equal or less the duration of the first part;

select the signal power of the first power state such that the binary values are distinguishably decodable; and transmit the signal using the selected duration of the parts and the selected signal power of the first power state.

2. The transmitter of claim 1, wherein the signal power of the first power state is selected to be a maximum power given by any of specified minimum hardware capacity of one of the transmitter regulatory limitations, whichever put power boundaries.

3. The transmitter of claim 2, wherein an average power of a bit is predefined, and wherein the selection of the signal power of the first power state and the duration of the second part is made based thereon.

4. The transmitter of claim 1, wherein the second part comprises $½^n$ of the duration of the bit, where n is any of 1, 2 or 3.

5. The transmitter of claim 1, wherein the duration of the second part and the signal power of the first power state are jointly selected.

6. The transmitter of claim 1, wherein the second and third power states have equal signal power.

7. The transmitter of claim 6, wherein the second and third power states include one of a zero and a close to zero signal power.

8. The transmitter of claim 1, wherein the third power state has a higher signal power than the second power state, and the second power state includes one of a zero and a close to zero signal power.

9. The transmitter of claim 1, wherein the second power state has a higher signal power than the third power state, and the third power state includes one of a zero and a close to zero signal power.

10. The transmitter of claim 1, wherein the signal is arranged to represent a first binary value of a symbol by the first power state and a second binary state of a symbol by the third power state during the second part.

11. The transmitter of claim 1, wherein the signal is arranged such that a first binary value of a symbol is represented by the third power state during a first portion of the second part followed by the first power state during a rest of the second part, and a second binary value of a symbol is represented by the first power state during a first portion of the second part followed by the third power state during a rest of the second part.

12. The transmitter of claim 1, wherein the transmitter is part of a communication apparatus.

13. The transmitter of claim 12, wherein the communication apparatus is a network node arranged to transmit a wake-up signal arranged to turn on a main transceiver of a remote terminal such that the network node and the remote terminal become enabled to exchange data traffic.

14. A method performed by a transmitter to transmit binary information using a binary amplitude shift keying, information symbols being represented by a signal including a first power state and a second power state, the first power state having a higher signal power than the second power state, a duration of a bit including a first part where the second power state is applied irrespective of which binary value is represented and a second part where a binary value is represented by one of the first power state, a third power state and a combination pattern of the first power state and the third power state, the first power state having a higher signal power than the third power state, the method comprising:

selecting the duration of the second part to be equal or less the duration of the first part;

selecting the signal power of the first power state such that the binary values are distinguishably decodable; and transmitting the signal using the selected duration of the parts and the selected signal power of the first power state.

15. The method of claim 14, wherein the selecting of the signal power of the first power state is selected to be a maximum power given by any of specified minimum hardware capacity of one of the transmitter regulatory limitations, whichever put power boundaries.

16. The method of claim 15, wherein an average power of a bit is predefined, and wherein the selecting of the signal power of the first power state and the selecting of the duration of the second part is made based thereon.

17. The method of claim 14, wherein the selecting of the duration of the second part comprises selecting $\frac{1}{2^n}$ of the duration of the bit, where n is any of 1, 2 or 3.

18. The method of claim 14, wherein the selecting of the duration of the second part and the selecting of the signal power of the first power state are jointly performed.

19. The method of claim 14, wherein the second and third power states have equal signal power.

20. The method of claim 19, wherein the second and third power states include one of a zero and a close to zero signal power.

21. The method of claim 14 wherein the third power state has a higher signal power than the second power state, and the second power state includes one of a zero and a close to zero signal power.

22. The method of claim 14, wherein the second power state has a higher signal power than the third power state, and the third power state includes one of a zero and a close to zero signal power.

23. The method of claim 14, wherein the signal is arranged to represent a first binary value of a symbol by the first power state and a second binary state of a symbol by the third power state during the second part.

24. The method of claim 14, wherein the signal is arranged such that a first binary value of a symbol is represented by the third power state during a first portion of the second part followed by the first power state during a rest of the second part, and a second binary value of a symbol is represented by the first power state during a first portion of the second part followed by the third power state during a rest of the second part.

25. A non-transitory computer storage medium storing a computer program comprising instructions which, when executed on a processor of a transmitter, causes the transmitter to:

transmit binary information using a binary amplitude shift keying, information symbols being represented by a signal including a first power state and a second power state, the first power state having a higher signal power than the second power state, a duration of a bit including a first part where the second power state is applied irrespective of which binary value is represented and a second part where a binary value is represented by one of the first power state, a third power state and a combination pattern of the first power state and the third power state, the first power state having a higher signal power than the third power state;

select the duration of the second part to be equal or less the duration of the first part;

select the signal power of the first power state such that the binary values are distinguishably decodable; and transmit the signal using the selected duration of the parts and the selected signal power of the first power state.

* * * * *